July 1, 1930.  G. HENRIKSON  1,768,981
TRAWL REEL
Filed June 6, 1929
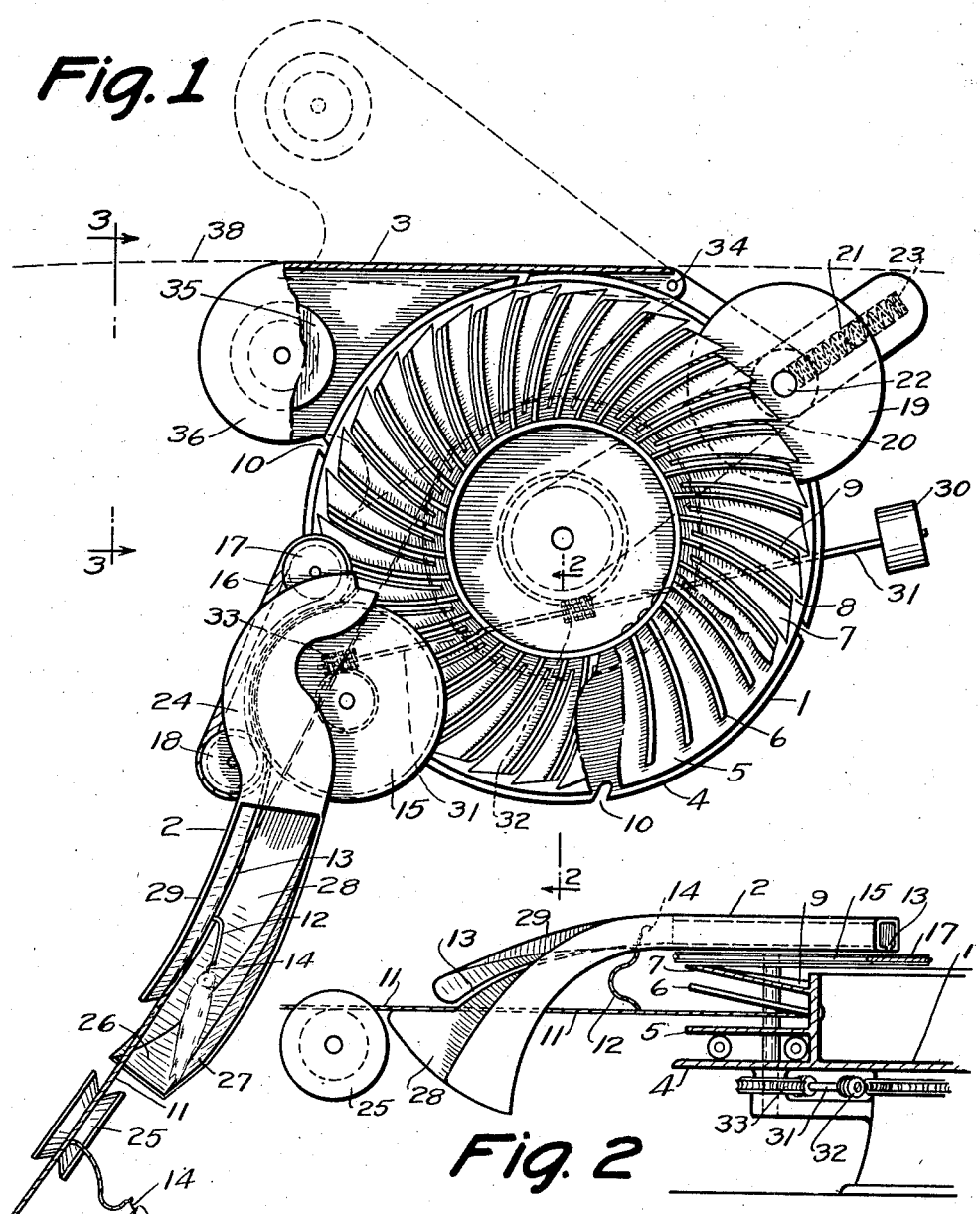
Fig. 1
Fig. 2
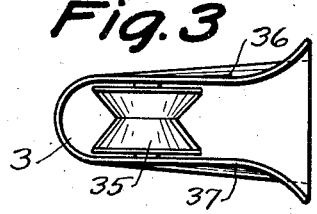
Fig. 3
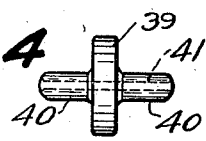
Fig. 4
INVENTOR
Gust Henrikson
BY
Harry Bowen
ATTORNEY Patented July 1, 1930

1,768,981

UNITED STATES PATENT OFFICE

GUST HENRIKSON, OF SEATTLE, WASHINGTON

TRAWL REEL

Application filed June 6, 1929. Serial No. 368,912.

The invention is a reel that is particularly adaptable for handling the gear of halibut fishing or the like, in which the ground line with the ganyons, floats and sinkers may be wound upon a common reel, the fish removed and hooks baited while on the reel and fed outward from the said reel.

The object of the invention is to provide a complete device for handling the complete gear of ground line fishing as a unit.

Another object of the invention is to provide a reel upon which a ground line may be wound which has a plurality of compartments to accommodate the different parts of the line.

Another object of the invention is to provide means in combination with the reel for accommodating short lines extending from the main line as the main line is wound upon the reel.

A further object of the invention is to provide a combination reel for accommodating a plurality of parts of a fishing line in which the reel is so constructed that the gear may be fed from the side opposite to that from which it is wound upon the reel.

And a still further object of the invention is to provide a combination trawl reel which is of a simple and economical construction.

With these ends in view the invention embodies a reel having a compartment for sinkers and floats, another compartment for the ground line, another compartment for the ganyons, and a plurality of upper compartments for the hooks, in combination with an intake chute having means therein for feeding the gear into the different compartments, a wheel for forcing the ganyons into the proper compartments and a chute through which the gear may be fed when laying the line.

Other features and advantages of the invention will appear from the following description taken in connection with the drawings, wherein:—

Figure 1 is a plan view of the reel with the parts broken away.

Figure 2 is a cross section through a portion of the reel showing the intake chute as indicated by the line 2—2.

Figure 3 is a view looking toward the end of the discharge chute as indicated by the arrows on line 3—3 of Figure 1.

Figure 4 is a detail showing a special sinker that is adaptable for use with the reel.

In the drawings the device is shown as it would be made wherein numeral 1 indicates the reel, numeral 2 the intake chute, and numeral 3 the discharge chute.

The reel 1 is made as shown with a cylindrical shaped central portion having an outstanding flange 4 extending continuously around the lower edge, another flange as indicated by the numeral 5, spaced a short distance above the flange 4, a plurality of prongs 6 extending outward from the central member, as shown in Figures 1 and 2, and a web 7 with curved slots 8 extending inward from the outer edge thereof extending continuously around the upper portion of the central member. The slots 8 divide the web 7 into a plurality of outstanding plates which slope upward from the central member and each of the plates is provided with a reenforced rib 9. The outer edge of the flange 4 is provided with a plurality of notches 10 in which a ring or loop at the end of the line may be caught when the line is started upon the reel. The line, which is indicated by the numeral 11, is wound upon the portion of the reel between the prongs 6 and the flange 5, as shown in Figure 2, with the floats or sinkers placed in the space between the flanges 4 and 5 and the ganyons, as indicated by the numeral 12, extending upward through a slot 13 in the intake chute 2 so that the hooks, as indicated by the numeral 14, will pass through the upper portion of the chute 2. It will be noted that the chute 2 extends over the reel and a pulley 15 is placed between the chute and reel so that it in combination with a round belt 16 passing around pulleys 17 and 18 may feed the hooks through the ganyons to the slots 8 in the web 7. It will be noted that the curvature of the slots and the movement of the reel 1 which moves in a clockwise direction, will cause the ganyons and hooks to move in toward the center of the reel. The belt 16 will travel at a speed which is about three times that of the circumference of the reel so that it will have a tendency to throw the ganyons and hooks into the inner ends of the slots. Another wheel 19 is positioned between the prongs 6 and web 7, as shown in Figure 1, so that it will assist in forcing the ganyons and hooks in toward the center of the reel as they pass. This wheel 19 is mounted in a bracket 20 from the base of the reel and the bracket 20 is provided with an elongated slot 21 in which the shaft 22 of the wheel 19 is mounted and this slot is provided with a spring 23 which holds the wheel 19 towards the center and also permits it to move outward to clear an obstruction.

The intake chute 2 is formed with a rectangular shaped box 24 which is positioned above the reel and pulley 15 and it curves outward and downward as shown in Figure 2. It will be observed that the line 11 is fed to the outer end of the chute over a pulley 25 which may be positioned at the side of a boat and as the line enters the chute it passes through the slot 13 and beneath the chute 2 shown in Figure 2 with the ganyons extending upward through the slot. The chute is formed with a V shaped outer end having sides 26 and 27, a bottom 28, and a side member 29, as shown in Figures 1 and 2 and it will be observed that should the man removing the fish from the line fail to remove all of them the fish will pass up the chute 2 and may rest upon the web 7, or the top of the reel so that it will not be necessary to stop the reel while bringing in the line.

The reel may be driven by a pulley or motor 30 through a shaft 31 by worm gears 32 and the same shaft may drive the pulley 15 through worm gears 33. It will be understood however that any other suitable means may be used for driving the device.

The discharge chute 3 is pivotally mounted at the point 34 and is provided with a sheave 35 mounted between the outwardly flaring side members 36 and 37 as shown in Figure 3. It will be observed that the end of the line may be started through this chute and the chute opened to the position shown in dotted lines in Figure 1 so that it may extend beyond the side of the boat. The device may be positioned so that when the chute 3 is folded inward it will come within the limits of the boat, the side of which in the design shown, is indicated by the dotted line 38.

It will be observed that instead of using an anchor or sinker of the ordinary type it will be desirable to use a small round sinker, as shown in Figure 4, which is made of a disk 39 having round extensions 40 at the sides and with an opening 41, as shown in dotted lines extending through it through which the line may be placed. It is understood that although this sinker is shown round it may be square or of any suitable shape and is preferably made so that it may be placed in the space between the flanges 4 and 5 of the reel.

It will be understood that other changes may be made in the construction without departing from the spirit of the invention. One of which changes may be in the design or arrangement of any of the parts of the reel, another may be in the use of other means for feeding the line to the reel, another may be in the use of other means by which the line may be discharged from the reel, and still another may be in the use of other means for operating the reel or parts thereof.

The construction of the device will be readily understood from the foregoing description. In use the device may be provided as shown and as hereinbefore stated a ring or loop at the end of the line may be caught in one of the notches 10 of the flange 4, the sinkers and floats placed in the space between the flanges 4 and 5, the main line wound between the flange 5 and the prongs 6 with the ganyons extending upward through the slots in the web 7 and the hooks placed above the web 7. In this manner the entire gear may be wound upon the device as a unit, the hooks baited, and the gear again placed out as a unit. This provides considerable improvement in the handling of fishing gear of this type because by using practically all other gear it is necessary to separate the line into sections and remove the floats and sinkers whereas with a device of this nature it is possible to keep the entire line intact so that it may be handled as a unit.

Having thus fully described the invention what I claim as new and desire to secure by Letters Patent, is:—

1. In a trawl reel of the character described, a reel having a plurality of compartments, an intake chute cooperating with the said compartments for feeding the line to the said compartments with extensions therefrom extending through slots in webs between the said compartments, means for forcing the said extensions into the said compartments, and means through which the said line may be discharged.

2. In a fish line gear handling mechanism of the character described, a horizontally positioned reel having a lower compartment for floats and sinkers, a midway compartment for the line, and a plurality of upper compartments for ganyons and hooks extending from the line, means for feeding the said gear to the said reel, and means through which the said gear may be discharged from the said reel.

3. In a device of the character described, a vertically positioned cylindrical member, a plurality of horizontal flanges extending from the said cylindrical member, a fishing gear, a suitable sinker for the said gear adaptable to be placed between the flanges of the said cylindrical member, a chute for feeding the said gear to the said cylindrical member with the different parts of the gear between different flanges, means for forcing parts of the gear between the said flanges, a suitable discharge chute, and means for operating the said cylindrical member and feeding mechanism.

In testimony whereof I affix my signature.

GUST HENRIKSON.